United States Patent [19]

Fukahori

[11] Patent Number: 4,963,902
[45] Date of Patent: Oct. 16, 1990

[54] CAMERA SYSTEM
[75] Inventor: Hidehiko Fukahori, Kanagawa, Japan
[73] Assignee: Canon Kabushiki, Tokyo, Japan
[21] Appl. No.: 297,350
[22] Filed: Jan. 17, 1989

[30] Foreign Application Priority Data

Jan. 19, 1988 [JP] Japan .......................... 63-004829[U]
Jun. 23, 1988 [JP] Japan .......................... 63-083056[U]

[51] Int. Cl.⁵ ............................................. G03B 17/08
[52] U.S. Cl. ...................................... 354/64; 354/286
[58] Field of Search .................................. 354/64, 286

[56] References Cited

U.S. PATENT DOCUMENTS

| 3,162,106 | 12/1964 | de Wouters d'Oplinter | 354/64 |
| 3,179,028 | 4/1965 | Wöhner | 354/286 X |
| 3,682,069 | 8/1972 | Lecoeur | 354/286 |
| 4,168,897 | 9/1979 | Gates | 354/64 X |
| 4,466,019 | 8/1984 | Sakashita | 354/286 X |

Primary Examiner—Michael L. Gellner
Attorney, Agent, or Firm—Fitzpatrick, Cella, Harper & Scinto

[57] ABSTRACT

A camera system includes a camera body and an interchangeable lens. The camera body includes a camera-side mount, a groove which is disposed in rear of a mount abutting face of the camera-side mount in the direction of the optical axis and which is formed on an outer circumference of the camera-side mount, and a ring-shaped elastic member which is disposed in the groove. The interchangeable lens includes a lens-side mount which is mountable on the camera-side mount, and a tubular protruding part which is disposed in rear of a mount abutting face of the lens-side mount in the direction of the optical axis and which has an inner circumferential face arranged to come into pressure contact with the ring-shaped elastic member.

11 Claims, 7 Drawing Sheets 4,963,902

CAMERA SYSTEM

BACKGROUND OF THE INVENTION

1. Field of the Invention:

This invention relates to a water-proof mount mechanism for a camera of the lens-interchangeable type.

2. Description of the Related Art:

There have been two kinds of water-proof mount mechanisms adapted for lens-interchangeable type cameras.

The water-proof mount mechanism of the first kind has been arranged to have an annular elastic member disposed on an abutting face for abutment in the direction of the optical axis of the camera, as disclosed for example, in Japanese Utility Model Publication No. SHO 61-39403.

The water-proof mount mechanism of the second kind has been arranged as shown in FIG. 4 of the accompanying drawings. Referring to FIG. 4, the illustration includes a camera-side mount 1; a protruding part 1b; an abutting face 1c of the camera-side mount 1; a leaf spring 2; a mirror box 3; a camera exterior member 4; a mirror 5; a focusing screen 6; a pentagonal prism 7; a lens-side mount 10; a claw 10a of the lens-side mount 10; an abutting face 10b of the lens-side mount 10; a lens exterior member 11; a groove 11b; a lens glass carrying frame 12; lens glasses 13 and 14; and a ring-shaped elastic member P4. In other words, a water-proof mount mechanism is arranged as follows: The protruding part 1b which is disposed at the peripheral end of the camera-side mount 1 protrudes toward the lens. The lens exterior member 11 is provided with the groove 11b. The ring-shaped elastic member P4 is arranged in the groove 11b to be in pressure contact with the inner circumferential face of the protruding part 1b when the lens is mounted on the camera body.

In the conventional mechanism of the first kind mentioned in the foregoing, the elastic member is disposed at the abutting face for abutment in the direction of the optical axis. This mechanism does not ensure that a predetermined distance required between the camera body and the lens in the direction of the optical axis is kept unvarying, because the distance is dependent upon the pressure of the elastic member. The required precision for the distance between the camera body and the lens in the direction of the optical axis is very severe. In order to solve this problem, the force of an urging member for abutment in the direction of the optical axis must be increased. However, the increase in the force of the urging member increases a torque required for mounting and dismounting the lens and thus degrades the operability of the camera system in mounting and dismounting the lens.

Meanwhile, in the case of the conventional mechanism of the second kind, the elastic member is arranged to come into contact in a direction perpendicular to the optical axis. This arrangement relieves the mechanism from the above-stated problem of the mechanism of the first kind. However, in cases where the camera system must be arranged to permit use of a lens which is interchangeable in respect of a mount dimension but is not provided with any water-proof arrangement, as shown in FIG. 5, the mechanism of the second kind presents the following problem: The outside diameter of the above-stated protruding part 1b inevitably increases because the inside diameter of the protruding part 1b must be arranged to escape from a lens exterior member 11' of a lens having a maximum diameter. Even in a case where the camera system is designed only for water-proof lenses, the outside diameter of the protruding part 1b can hardly be reduced as this part must be arranged to permit use of any of them that has the largest diameter among them. Besides, the camera system in this instance does not have interchangeability with a lens of the ordinary kind having an outside diameter larger than the inside diameter of the protruding part 1b.

Further, Japanese Laid-Open Utility Model Application No. SHO 57-82324 discloses an arrangement which is similar to the structural arrangement of FIG. 4. In the case of that application, although a groove and a ring-shaped elastic member are provided on the side of the camera body, the groove is formed along the inner side of a tubular part. Therefore, it is normally impossible to mount an ordinary interchangeable lens.

SUMMARY OF THE INVENTION

It is one aspect of this invention to provide a camera system having a camera body and an interchangeable water-proof lens, wherein a groove is formed in the outer circumference side of a lens mount part of the camera body around an optical axis; an elastic member is disposed in the groove; and on the interchangeable water-proof lens is formed a tubular protruding part whose inside diameter face is arranged to be in contact with the elastic member. The camera system is thus arranged to permit not only the interchangeable water-proof lens but also an ordinary interchangeable lens to be mounted on the camera body.

The above and other aspects and features of the invention will become apparent from the following detailed description of embodiments thereof taken in conjunction with the accompanying drawings.

BRIEF DESCRIPTION OF THE DRAWINGS

FIG. 1 is a sectional view taken along the central parts of a camera body and a lens. FIG. 2 is a central sectional view showing the camera body in a state of having an ordinary lens mounted thereon.

DETAILED DESCRIPTION OF THE PREFERRED EMBODIMENTS

Figure 1:
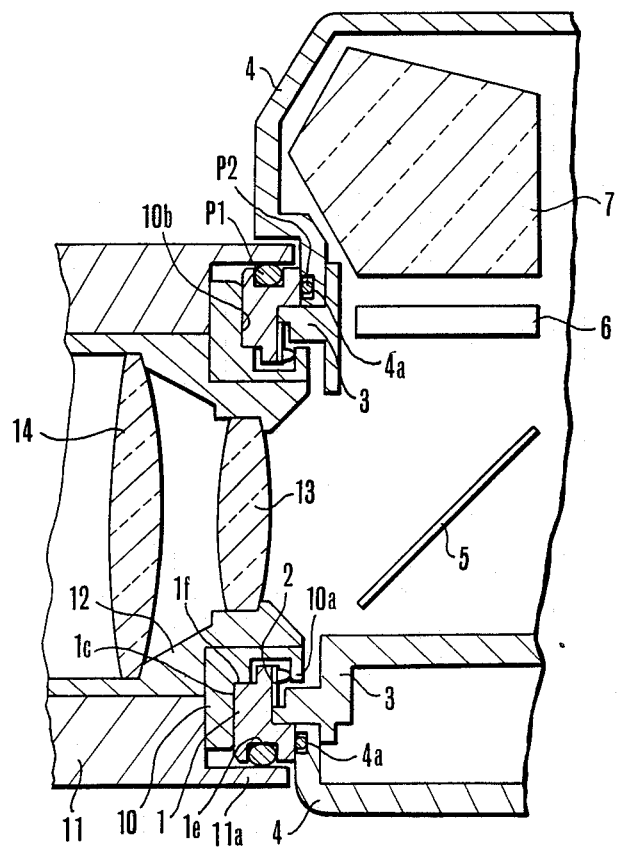
FIGS. 1 to 3 show a first embodiment of this invention.
Figure 2:
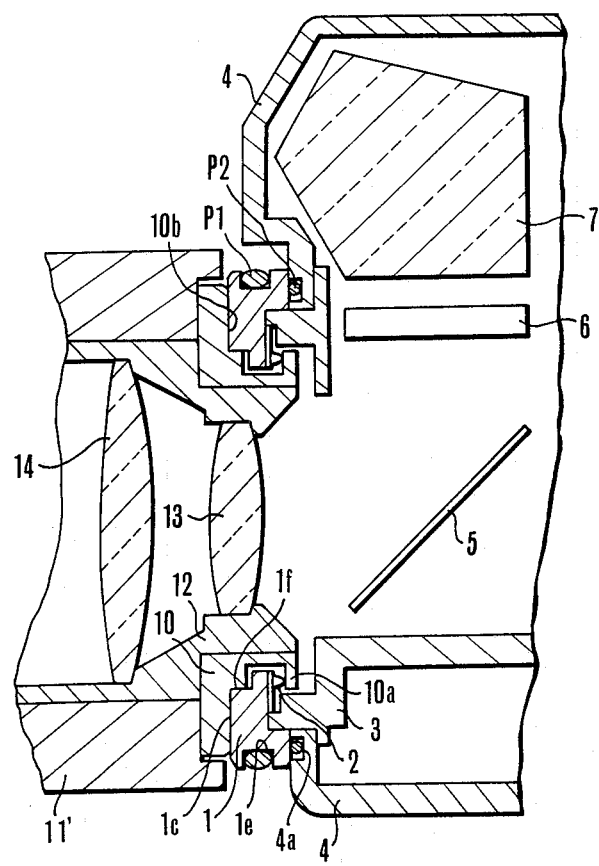
Figure 3:
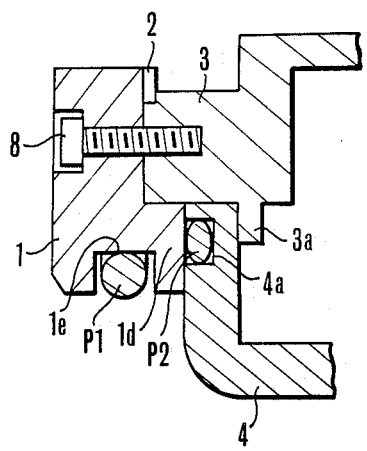
Figure 4:
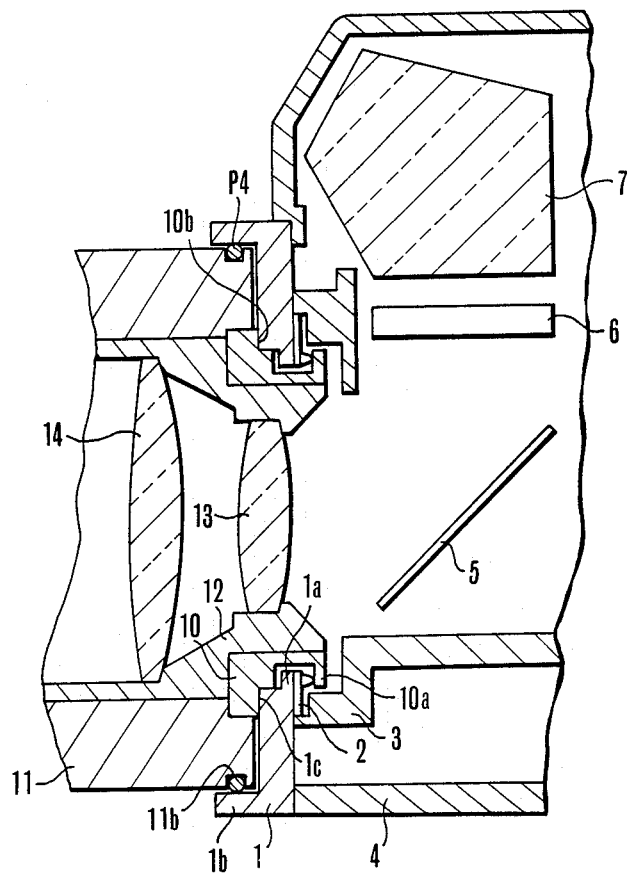
FIG. 4 is a sectional view showing by way of example the prior art.
Figure 5:
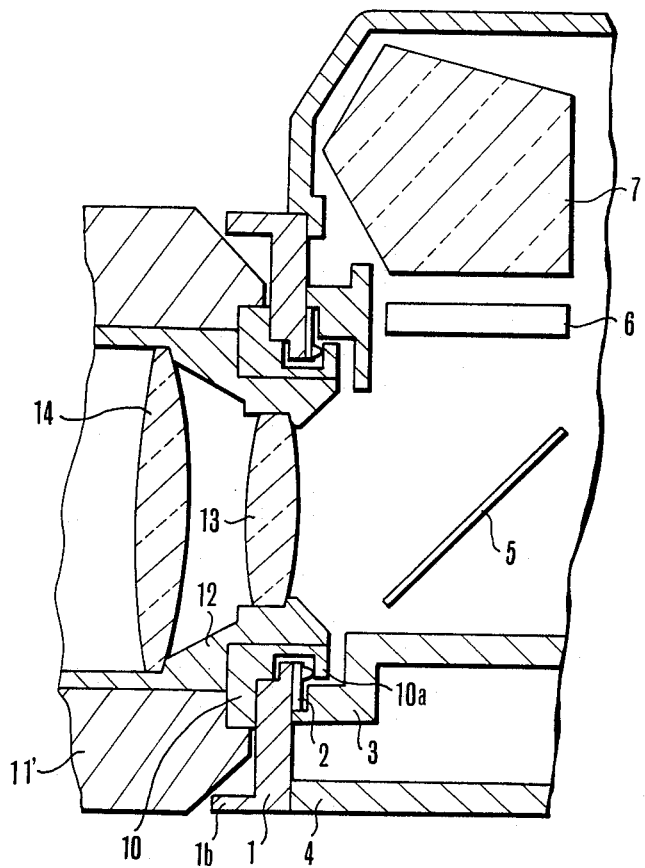
FIG. 5 is a sectional view showing the camera body of FIG. 4 in a state of having an ordinary lens mounted thereon.

FIGS. 1 to 3 show a first embodiment of this invention. Referring to FIGS. 1 to 3, a camera-side mount 1 has a groove 1e formed on its outer circumference near the end part thereof; a fitting part 1f arranged to engage a lens-side mount 10 in the radial direction thereof; and a mount abutting face 1c for abutment in the direction of the optical axis. The mount abutting face 1c protrudes farthest toward the lens in the direction of the optical axis. The groove 1e is located behind the mount abutting face 1c in the direction of the optical axis.

A leaf spring 2 is arranged to urge the lens to abut on the camera body in the direction of the optical axis of the lens. The leaf spring 2 is interposed in between a mirror box 3 and the camera-side mount 1. A camera exterior member 4 is provided with a ring-shaped groove 4a. A mirror 5 is arranged to guide an object light flux passing through the lens to a viewfinder which is not shown. At the time of a shutter release, a mechanism which is not shown uplifts the mirror 5 to retract it away from a photographing optical path. The illustration further includes a focusing screen 6; a pentagonal prism 7; and a mount fixing screw 8 (see FIG. 3). A lens-side mount 10 constitutes a known bayonet mount having three claws in combination with the camera-side mount 1. The arrangement of the lens-side mount 10 is similar to a mount arrangement disclosed in Japanese Utility Model Publication No. SHO 61-39403. Further, the lens-side mount 10 is provided with a lens-side mount claw 10a which is arranged to abut on the above-stated leaf spring 2, and a lens-side mount abutting face 10b. A lens exterior member 11 is provided with a tubular protruding part 11a which is arranged to protrude farther toward the camera body than the mount abutting faces 1c and 10b in the optical axis direction. A reference numeral 12 denotes a lens glass carrying frame. Numerals 13 and 14 denote lens glasses. A ring-shaped elastic member P1 is disposed in the above-stated groove 1e. Another ring-shaped elastic member P2 is disposed in the above-stated groove 4a.

With the water-proof mount mechanism of the lens-interchangeable type camera arranged as shown in FIG. 1, the lens is mounted on the camera body in the following manner: The lens-side mount 10 is pushed against the camera-side mount 1 in the direction of the optical axis by adjusting the lens position to a mark which is not shown. Then, the ring-shaped elastic member P1 first comes into pressure contact with the inside diameter face of the tubular protruding part 11a. The lens is then tightly sealed along the whole circumference thereof. The elastic member P1 is somewhat elongated beforehand in such a way as to come into tight contact with the groove 1e. With the lens further pushed inward to bring the mount abutting faces 1c and 10b into contact with each other, the fitting part 1f causes the optical axis of the camera body and that of the lens to coincide with each other. When the lens comes to collide against the abutting face 1a, the whole lens is rotated until the rotation of the lens is locked by a lock mechanism which is not shown. With the lens set in this locked position, the leaf spring 2 and the lens-side mount claw 10a are in contact with each other. Since the leaf spring 2 exerts an urging force on the lens-side mount claw 10a in the direction of the optical axis toward the camera body, a distance between the lens and the camera body is kept unvarying with the abutting face 10b of the lens-side mount 10 kept in a position of abutting upon the abutting face 1c of the camera-side mount 1 by virtue of the urging force.

FIG. 2 shows the water-proof camera body in a state of having an ordinary lens mounted thereon. Since the abutting face 1c of the camera-side mount 1 is in the position of protruding farthest toward the lens in the direction of the optical axis, the lens can be mounted on the camera body without any problem that otherwise would arise in connection with the outside diameter of the lens. Further, in this case, the lens exterior member 11' of the ordinary lens is not provided with the tubular protruding part 11a, while the mount claw 10a is in the same shape as in the case of the water-proof lens.

FIG. 3 is a sectional view taken across the camera-side mount 1 at a part thereof having no claw. Since there are only three claws, the camera-side mount 1 is secured by means of the screw 8 to the mirror box 3 using a space available between the part of the mount 1 having no claw and the mirror box 3. In this case, the ring-shaped elastic member P2 which is disposed in the ring-shaped groove 4a of the camera exterior member 4 is in pressure contact with an exterior member abutting part 1d of the mount 1. This pressure contact gives a water-proof state between the mount 1 and the camera exterior member 4.

In accordance with the arrangement described above, the embodiment is provided with a groove which is formed in the outside diameter end of the lens mount part of the camera body and which is located behind a mount abutting face in the direction of the optical axis; and a ring-shaped elastic member which is arranged in the groove to be in pressure contact in a water-proof manner with the inner diameter face of a tubular protruding part of the lens when the lens is mounted on the camera body. This arrangement enables the camera-side mount to be produced in a very small size to permit reduction in size of the camera system. Further, since the pressure contact is brought about by a pressure exerted in the radial direction, the distance between the lens and the camera body can be kept unvarying in the direction of the optical axis. It is another advantage of the embodiment that an ordinary lens can also be mounted on the camera body as well as the water-proof type lens. Besides, any lens is mountable as long as the mount part thereof is the same in shape irrespective of the outside diameter of the lens. Further, by fixing the camera-side mount, the camera exterior member and the camera-side mount can be directly brought into a water-proof state.

Figure 6:
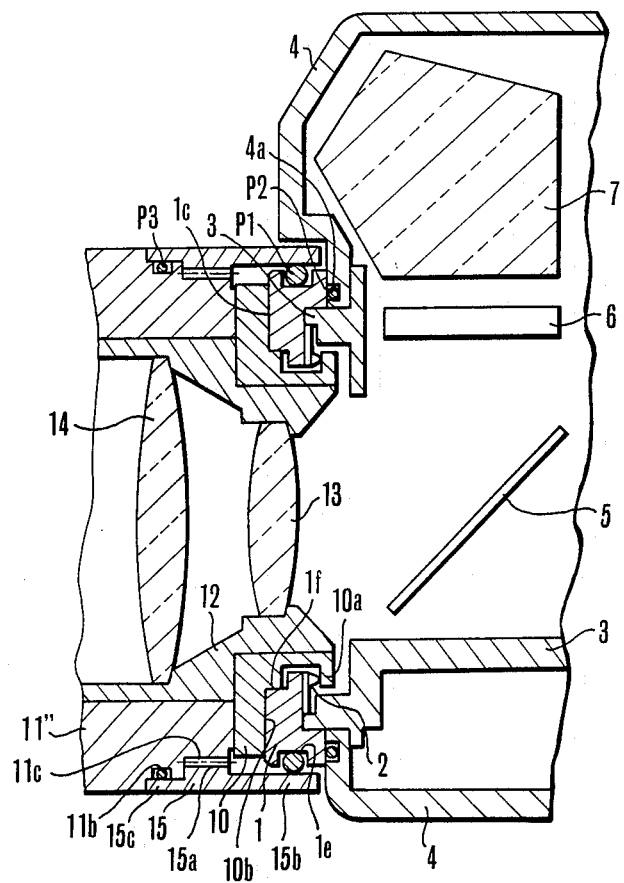
FIG. 6 is a central sectional view showing a combination of a camera body and a lens arranged as a second embodiment of the invention.
Figure 7:
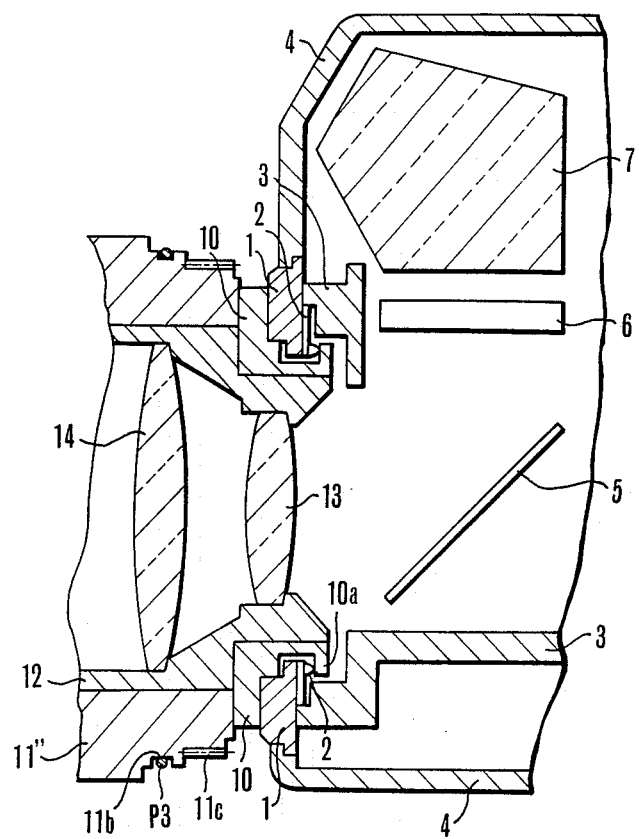
FIG. 7 a central sectional view showing a tubular protruding member of the lens of FIG. 6 in a state of being mounted on an ordinary camera body.

FIGS. 6 and 7 show a second embodiment of the invention. The second embodiment differs from the first embodiment only in a part of the water-proof type interchangeable lens. Therefore, the following description is limited to the different part. Referring to FIGS. 6 and 7, a reference numeral 11" denotes a lens exterior member. The lens exterior member 11" has a groove 11b and a threaded part 11c. A tubular protruding part 15 has a threaded part 15a. The tubular protruding part 15 and the lens exterior member 11" are detachably coupled with each other by means of these threaded parts 11c and 15a. The tubular protruding part 15 includes a first tubular part 15b which is arranged to abut on an elastic member P1 disposed on the side of the camera body and a second tubular part 15c which is arranged to abut on an elastic member P3 disposed on the side of the lens.

When the lens is mounted on the camera body, the member 15 has the first tubular part 15b located in rear of the mount abutting face 10b and the second tubular part 15c located in front of the mount abutting face 10b as viewed in the direction of the optical axis. The above-stated elastic member P3 is in a ring shape and is disposed in the above-stated groove 11b.

In the case of the water-proof mount mechanism of the interchangeable lens type camera shown in FIG. 6, the detachable type tubular protruding member 15 is brought into tight contact with the lens exterior member 11" by the ring-shaped elastic member P3.

In FIG. 7, the camera system is shown in a state of having a water-proof lens mounted on an ordinary camera body. In this instance, the lens cannot be mounted on the camera body if the tubular protruding member 15 shown in FIG. 6 is left in position. Therefore, the member 15 is detached from the lens exterior member 11" by rotating the member 15 to disengage the threaded part 15a from the threaded part 11c.

Since the ordinary camera bodies are arranged to embody diverse specifications respectively, the use of the water-proof type lens in combination with any of these different camera bodies as desired in accordance with the arrangement of this embodiment greatly enlarges the range of possibility of photography.

With respect to the interchangeable lens on the other hand, lenses of varied kinds are available including lenses of different full-aperture F numbers, zoom lenses of different focal lengths and high performance lenses which use aspherical lenses. However, the invented water-proof arrangement cannot be considered to be applicable to all of these lenses because of their own structural arrangement and the cost involved.

In accordance with the arrangement of the second embodiment described, the tubular protruding member comes into pressure contact in a water-proof manner with the elastic member which is provided on the lens mounting part of the camera body of the lens-interchangeable type camera. This provides a water-proof structural arrangement between the camera body and the lens. Further, the tubular protruding member is detachably mounted on the interchangeable lens. That arrangement permits the lens to be mounted on an ordinary camera. Therefore, as long as the mounting claw parts are in the same shape as the embodiment, the arrangement of the embodiment permits varied combinations consisting of a water-proof camera body and a water-proof lens; a water-proof camera body and an ordinary lens; an ordinary camera body and a water-proof lens; and an ordinary camera body and an ordinary lens. The varied features of cameras thus can be utilized in combination with the varied features of interchangeable lenses, so that the possibility range of photography can be enlarged.

What is claimed is:

1. A camera system comprising:
   (a) a camera body including:
   (a-1) a camera-side mount;
   (a-2) a groove which is disposed in rear of a mount abutting face of said camera-side mount in the direction of an optical axis and which is formed on an outer circumference of said camera-side mount; and
   (a-3) a ring-shaped elastic member disposed in said groove; and
   (b) an optical accessory including:
   (b-1) an accessory-side mount which is capable of being coupled with said camera-side mount; and
   (b-2) a tubular protruding part which is disposed in rear of a mount abutting face of said accessory-side mount in the direction of the optical axis, said tubular protruding part having an inner circumferential face which is capable of being brought into pressure contact with said ring-shaped elastic member.

2. A camera system according to claim 1, wherein said optical accessory is an interchangeable lens.

3. A camera system according to claim 1, wherein said groove is formed in said camera-side mount.

4. A camera body comprising:
   (a) a camera-side mount;
   (b) a groove which is disposed in rear of a mount abutting face of said camera-side mount in the direction of an optical axis and which is formed on an outer circumference of said camera-side mount; and
   (c) a ring-shaped elastic member disposed in said groove.

5. An optical accessory mountable on and demountable from a camera body, comprising:
   (a) a camera-side mount, and a ring-shaped elastic member which is disposed in a groove positioned rearwardly of a mount abutting face of said camera-side mount in the direction of an optical axis, said groove being formed on an outer circumference of said camera-side mount;
   (b) an accessory-side mount which is mountable on said camera-side mount, said accessory-side mount comprising;
   (c) a tubular protruding part which is disposed rearwardly of a mount abutting face of said accessory-side mount in the direction of an optical axis and
   (d) said part having an inner diameter larger than said mount abutting face, an inner diameter of said part being arranged to contact said ring-shaped elastic member when said accessory-side mount is mounted on said camera-side mount.

6. A camera body according to claim 4, wherein said groove is formed in said camera-side mount.

7. An accessory according to claim 5, wherein said optical accessory is an interchangeable lens.

8. An optical accessory mountable on and demountable from a camera body, comprising:
   (a) a camera-side mount, and a ring-shaped elastic member which is disposed in a groove positioned rearwardly of a mount abutting face of said camera-side mount in the direction of an optical axis, said groove being form in an outer circumference of said camera-side mount;
   (b) an accessory-side mount which is mountable on said camera-side mount, said accessory-side mount comprising;
   (c) a member which is mountable on and demountable from said optical accessory, said member having a tubular part having an inner diameter larger than a mount abutting face of said accessory-side mount, said tubular part being located rearwardly of said mount abutting face in the direction of an optical axis when said member is mounted on said optical accessory, and an inner diameter surface of said tubular part being arranged to contact said ring-shaped elastic member when said accessory-side mount is mounted on said camera-side mount.

9. An accessory in claim 8, wherein said optical accessory is an interchangeable lens.

10. An optical accessory mountable on and demountable from a camera body, comprising:
    (a) an accessory-side mount which is mountable on said camera-body mount;
    (b) a member which is mountable on and demountable from said optical accessory, said member having a tubular part having an inner diameter larger than a mount abutting face of said accessory-side mount, said tubular part being located in rear of said mount abutting face in the direction of an optical axis when said member is mounted on said optical accessory;
    (c) an accessory-side groove which is disposed in rear of said mount abutting face of said accessory-side mount in the direction of the optical axis and which is formed on an outer circumference of said accessory-side mount;
    (d) a ring-shaped elastic member disposed in said groove; and (e) a second tubular part which is arranged at said member to come into pressure contact with said ring-shaped elastic member when said member is mounted.

11. An accessory according to claim 10, wherein said member is arranged to be mounted on said optical accessory in the neighborhood of said accessory-side mount while said member is rotated around the optical axis by means of a threaded mechanism.

* * * * *

UNITED STATES PATENT AND TRADEMARK OFFICE
CERTIFICATE OF CORRECTION

PATENT NO. : 4,963,902
DATED : October 16, 1990
INVENTOR(S) : Hidehiko Fukahori

It is certified that error appears in the above-identified patent and that said Letters Patent is hereby corrected as shown below:

On the title page, item [73] should read:

"Canon Kabushiki," should read
--Canon Kabushiki Kaisha,--.

COLUMN 6:

Line 13, "comprising;" should read --comprising:--;

Line 16, "axis and" should read --axis; and--;

Line 32, "form" should read --formed--;

Line 36, "comprising;" should read --comprising:--; and

Line 48, "in claim 8," should read --according to claim 8,--.

Signed and Sealed this

Nineteenth Day of January, 1993

Attest:

DOUGLAS B. COMER

Attesting Officer

Acting Commissioner of Patents and Trademarks